(12) United States Patent
Szczech

(10) Patent No.: US 6,372,162 B1
(45) Date of Patent: Apr. 16, 2002

(54) INJECTION MOLDING OF ORAL BRUSH BODIES

(75) Inventor: Gerald S. Szczech, Iowa City, IA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/386,191

(22) Filed: Aug. 31, 1999

(51) Int. Cl.⁷ .......................... B29C 45/18; B29C 45/77
(52) U.S. Cl. ................ 264/40.5; 264/297.2; 264/328.8; 264/328.13; 425/145
(58) Field of Search ............................ 264/40.5, 297.2, 264/328.8, 328.13, 243; 425/145

(56) References Cited

U.S. PATENT DOCUMENTS

| | | | |
|---|---|---|---|
| 4,635,313 A | * 1/1987 | Fassler et al. | |
| 4,691,404 A | * 9/1987 | Tarrson et al. | |
| 4,867,672 A | * 9/1989 | Sorensen | 264/328.13 |
| 5,241,031 A | 8/1993 | Mehta | 526/348.1 |
| 5,266,392 A | 11/1993 | Land et al. | 428/224 |
| 5,460,768 A | * 10/1995 | Akao et al. | 264/328.13 |
| 5,476,914 A | 12/1995 | Ewen et al. | 526/351 |
| 5,633,083 A | 5/1997 | Iwai et al. | 428/378 |
| 5,747,592 A | 5/1998 | Huff et al. | 525/191 |
| 5,758,383 A | 6/1998 | Hohlbein | 15/167.1 |
| 5,797,158 A | 8/1998 | Hoshizaki et al. | 15/167.1 |
| 5,836,769 A | 11/1998 | Spencer | 433/216 |
| 5,915,436 A | 6/1999 | Johnson et al. | 15/187 |
| 6,056,902 A | * 5/2000 | Hettinga | 264/328.13 |
| 6,060,005 A | * 5/2000 | Hettinga | 264/328.13 |
| 6,108,869 A | * 8/2000 | Meessmann et al. | |

FOREIGN PATENT DOCUMENTS

| | | | |
|---|---|---|---|
| DE | 197 54 762 C1 | 12/1998 | A46D/3/00 |
| EP | 0 293 665 A2 | 12/1988 | A46D/3/04 |
| EP | 0 464 286 A2 | 1/1992 | B29C/45/82 |
| GB | 2 330 791 A | 5/1999 | |
| JP | 10052316 | 2/1998 | A46B/3/04 |

OTHER PUBLICATIONS

Rifi, et al., "FLEXOMER™ Polyolefins: A Bridge Between Polyethylene and Rubbers," 1990, pp. 1–7.
Ficker, et al., "Fluidized–Bed, Ethylene–Alpha Olefin Interpolymers (FLEXOMER™ Polyolefins) As Modifiers for Polyproplyene," Oct. 8–11, 1991, Detroit, Michigan, 17 pages.
Fina Oil & Chemical Company, "An Introduction to Fina," circa 1996, 20 pages.
ASTM, Standard Test Method for Flow Rates of Thermoplastics by Extrusion Plastometer, Jan. 1996, pp. 1–9.
Fina Oil & Chemical Company, "FINA® Polypropylene, 3825," 6/96, 1 page.
Fina Oil & Chemical Company, "FINA® Polypropylene, 3824," 6/96, 1 page.
Exxon Chemical, "ESCORENE® Polypropylene, PP 1024," A General Purpose Homopolymer, 9/96, 1 page.
Exxon Chemical, "ESCORENE® Polypropylene, PP 1105, Controlled Rheology Injection Molding Resin," 9/96, 1 page.
Exxon Chemical, "Exxon Chemical Polypropylene Capabilities," Apr. 7, 1997, 13 pages.

(List continued on next page.)

Primary Examiner—Jill L. Heitbrink
(74) Attorney, Agent, or Firm—David A. Howley

(57) ABSTRACT

A method for making an oral brush body using an injection molding apparatus includes injecting polymer into a mold cavity at a pressure no greater than about 250 psi and in an amount sufficient to fill the cavity. The injection molding apparatus includes a mold that includes a cavity defining at least a portion of an oral brush body, and an injection unit in communication with the cavity and capable of injecting a polymer into the mold cavity at a pressure no greater than about 250 psi and in an amount sufficient to fill the cavity.

24 Claims, 3 Drawing Sheets

OTHER PUBLICATIONS

Ferry, et al., "Exxon Chemical Company Polypropylene Overview, Presented to Oral B Corporation," May 20, 1997, 15 pages.

Dow Chemical U.S.A., "Technical Data Sheet H702–35N, Polypropylene Homopolymer Resin," Feb. 20, 1998, 1 page.

Union Carbide, "FLEXOMER® POLYOLEFIN DFDB–1085 Natural," before Aug. 31, 1998, 2 pages.

Exxon Chemical, "ESCORENE Polypropylene, PP 1074, A General Purpose Injection Molding Resin," before Aug. 31, 1998, 1 page.

Exxon Chemical, "ESCORENE® Polypropylene, PP 1154, A Controlled Rheology Homopolymer," before Aug. 31, 1998, 1 page.

* cited by examiner

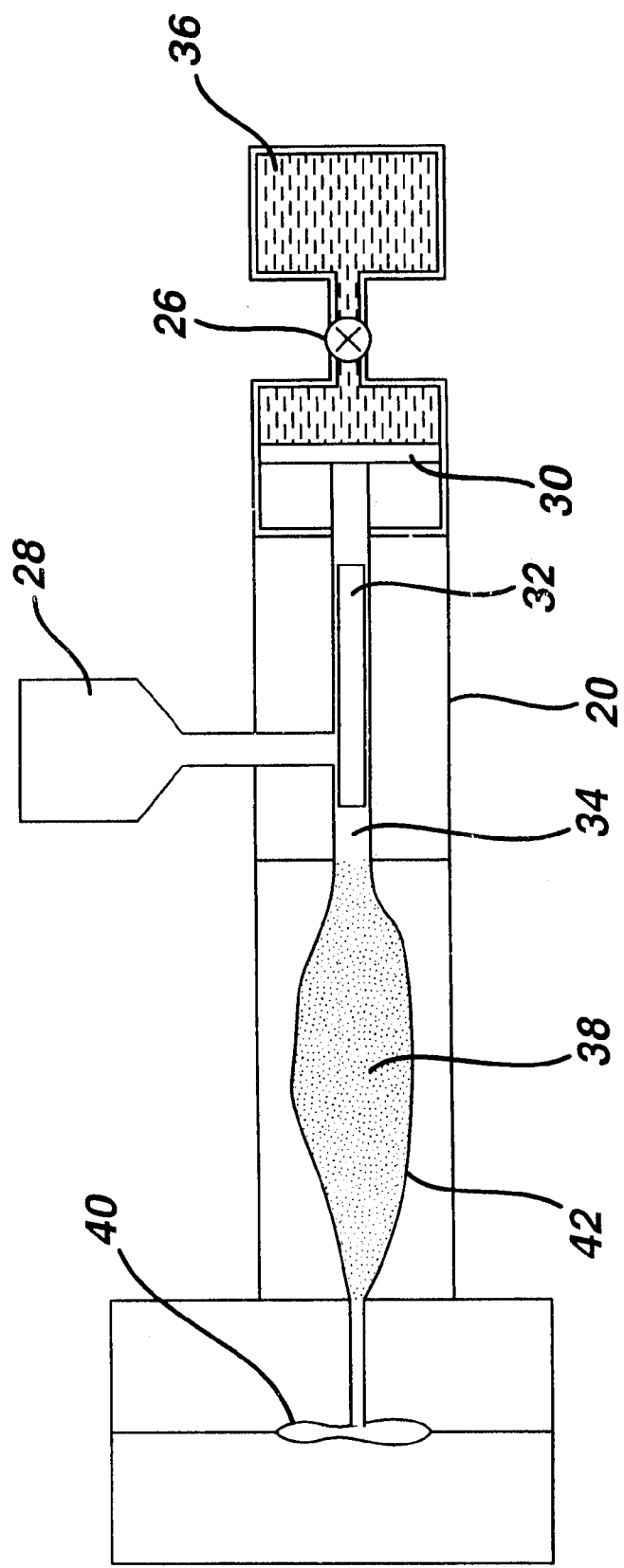

INJECTION MOLDING OF ORAL BRUSH BODIES

BACKGROUND OF THE INVENTION

The invention is directed to injection molding of oral brush bodies.

Injection molding is commonly used in the manufacture of oral brush bodies. Injection molding processes often involve injecting a thermoplastic polymer into a mold cavity under hydraulic pressure, allowing the polymer to harden, opening the mold, and then removing the molded body from the mold cavity. The mold cavity is defined by two mold halves. A clamping unit maintains the mold halves in a closed position while the polymer is injected into the cavity. The clamping unit applies a hydraulic pressure to close the mold and to maintain the mold halves in closed position until the mold cycle is complete.

The injection unit of an injection molding apparatus for simultaneously molding multiple oral brush bodies often experiences greater than 1000 psi of pressure during the process of injecting polymer into the mold cavity. This same apparatus often also has an idle pressure, i.e., the pressure of the molding apparatus during the period in which polymer is not being injected into the mold cavity, of at least 200 psi. The high pressures applied to the molding apparatus during a mold cycle can cause wear on the many components of the molding apparatus including, e.g., the clamping unit.

SUMMARY

In one aspect, the invention features a method of making an oral brush body using an injection molding apparatus that includes a mold cavity defining at least a portion of the oral brush body. The method includes injecting polymer into the mold cavity at a pressure no greater than about 250 psi and in an amount sufficient to fill the cavity. In one embodiment, the pressure is from about 100 psi to about 250 psi. In another embodiment, the pressure is from about 130 to about 200 psi. In other embodiments, the pressure is no greater than about 200 psi. In one embodiment, the method further includes altering the pressure during an injection molding cycle from the first pressure to a second pressure, the second pressure being no greater than about 220 psi.

In some embodiments, the method further includes injecting the polymer into a portion of the cavity at a pressure no greater than 850 psi prior to injecting the polymer at a pressure of no greater than about 250 psi, and reducing the pressure to no greater than about 250 psi. In another embodiment, the method further includes removing the oral brush body from the mold cavity. In some embodiments, the mold includes a plurality of mold cavities each defining an oral brush body, and the injecting further includes injecting polymer into the plurality of mold cavities at a pressure no greater than about 250 psi and in an amount sufficient to fill the cavities.

In one embodiment, the mold includes $2^{2+n}$ cavities each defining an oral brush body where n=0–3.

In other aspects, the invention features an injection molding apparatus that includes a mold that includes a cavity defining at least a portion of an oral brush body, and an injection unit in communication with the cavity, the injection unit being capable of injecting a polymer into the mold cavity at a pressure no greater than about 250 psi and in an amount sufficient to fill the cavity. In one embodiment, the apparatus further includes a control in communication with the injection unit, the control being capable of changing the pressure exerted on the injection unit during the course of an injection molding cycle. In other embodiments, the apparatus further includes a control in communication with the injection unit, the control being capable of comparing the amount of pressure exerted on the injection unit during a first injection molding cycle with a predetermined pressure and automatically adjusting such that the pressure exerted during a subsequent molding cycle achieves the predetermined pressure.

In another embodiment, the mold includes a plurality of cavities, each cavity defining at least a portion of an oral brush body, the injection unit being capable of injecting polymer into the cavities at a pressure no greater than about 250 psi and in an amount sufficient to fill the cavities. In one embodiment, the polymer includes polypropylene. In other embodiments, the polymer has a melt flow rate of from about 12 gm/10 min to about 35 gm/10 min.

In another aspect, the invention features an injection molding apparatus that includes: a) a mold that includes a plurality of cavities defining an oral brush body, b) an injection unit in communication with the cavities, and c) a control capable of applying a pressure of no greater than about 200 psi on the injection unit.

The injection molding process and apparatus are useful for manufacturing oral brush bodies and oral brushes at low injection pressures, i.e., pressures no greater than about 250 psi. The apparatus is capable of an idle pressure of 0 psi and can inject polymer into a mold cavity at pressures less than 250 psi. The low pressure of the process imparts less wear on the mold machinery relative to high pressure molding thereby increasing the useful life of the mold machinery.

The injection molding apparatus can also alter the amount of pressure exerted on the ram of the injection unit, and thus the polymer being injected, a number of times (e.g., 1–20 times) during the injection molding cycle. The ability to change the pressure throughout the molding cycle provides greater control over the injection molding process and, in particular, the stages of the injection molding cycle that involve filling more detailed and intricate parts of the body such as, e.g., a logo.

Polymer compositions having low melt flow indices, e.g., low viscosity polypropylene, can be used in the injection molding apparatus. The injection molding apparatus can inject polymer compositions into mold cavities or mold inserts that include individual tufts of bristles extending into the cavity at a predetermined position, e.g., to a predetermined depth, at a predetermined orientation, in a predetermined arrangement and combinations thereof The low pressure of the process enables the molten polymer to surround the exposed portion of the tuft, e.g., the tuft ball, and encapsulate the tuft ball, without altering the predetermined position of the tufts to such an extent that the resulting brushes fail to meet a predetermined criteria. The apparatus provides processes that simultaneously mold and tuft of oral brushes.

Additional features and advantages of the invention will be apparent from the description of the preferred embodiment thereof and from the claims.

BRIEF DESCRIPTION OF THE DRAWINGS

FIG. 3 is an enlarged side view taken in cross section of a portion of the injection molding apparatus of FIG. 1.

DETAILED DESCRIPTION

Figure 1:
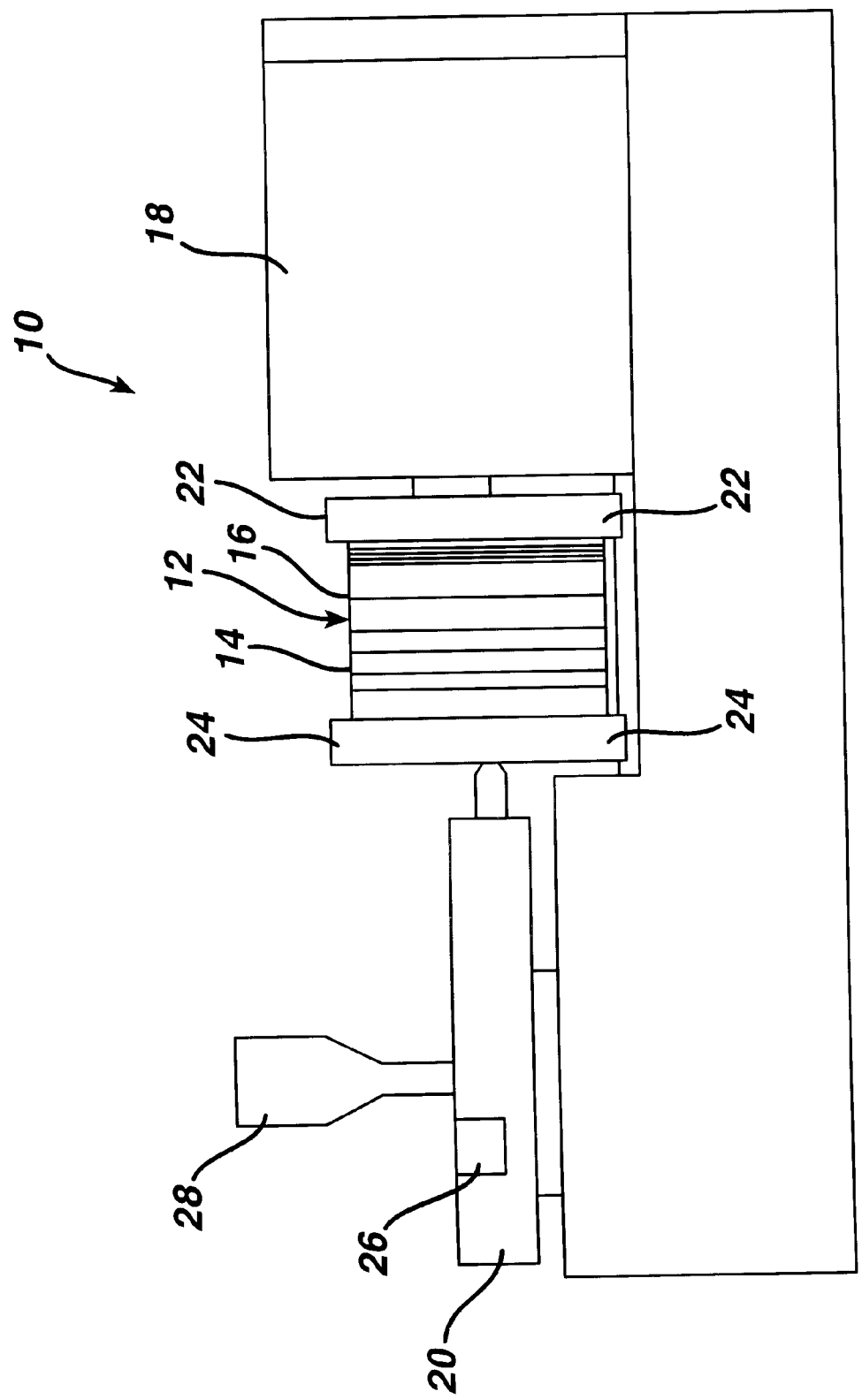
FIG. 1 is a side view of an injection molding apparatus.
Figure 2:
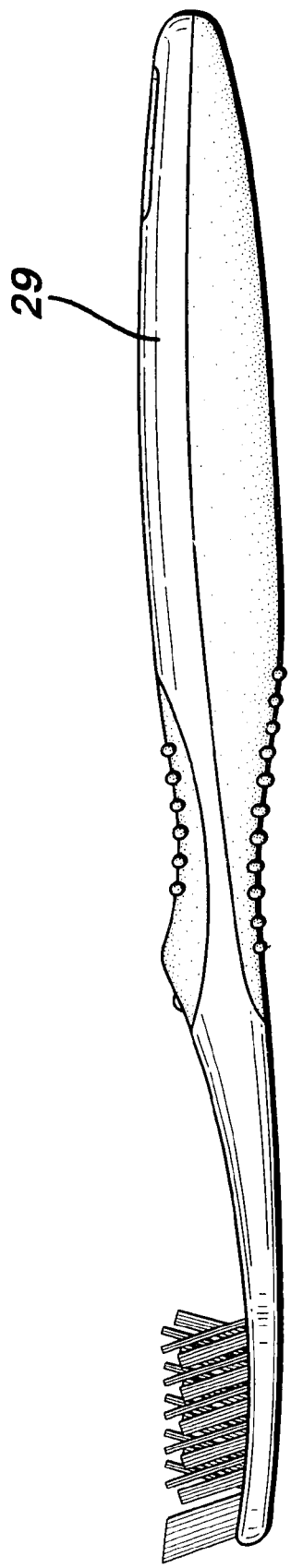
FIG. 2 is a perspective view of an oral brush manufactured using the molding apparatus FIG. 1.

Referring to the Figures, injection molding apparatus 10 includes a mold 12, a clamping unit 18, an injection unit 20, and a material hopper 28 in communication with injection unit 20. Mold 12 includes two platens 22, 24 at least one platen 22 of which is capable of moving toward and away from the other platen 24 along the plane of the mold 12. The mold also includes two mold halves 14, 16, which combine to define at least one cavity defining at least a portion of an oral brush body 29.

Hopper 28 provides polymer 38 (e.g., in the form of pellets, granules or powder) to the injection reservoir 42. While in the injection reservoir 42 the polymer 38 is heated to a molten state.

Pressure control 26 of injection unit 20 controls the pressure exerted by the hydraulic oil 36 of the system 10 on the injection ram 30, which, in turn, controls the flow of polymer 38 to the mold cavity(s) 40. Ram 30 presses on injection piston 32 disposed in injection cylinder 34. Piston 32 displaces molten polymer 38 from the injection unit 20 into mold cavity 40. The pressure control 26 is capable of limiting the system pressure of the hydraulic oil 36 at ram 30 to from 0 psi to about 850 psi during the polymer injection stage of an injection molding cycle. The pressure control preferably controls the amount of pressure exerted by the hydraulic oil 36 on ram 30 such that it is no greater than 250 psi, more preferably no greater than 200 psi, throughout at least a portion of the cavity filling process of the injection molding cycle, more preferably throughout the entire cavity filling process of the injection molding cycle.

Preferred pressure controls 26 are also capable of automatically adjusting the pressure of the hydraulic oil at ram 30 after a first injection molding cycle, such that a desired (e.g., target) pressure is applied during a subsequent injection molding cycle. More preferably, the pressure control is capable of 1) automatically adjusting the pressure exerted on the polymer during the course of the injection molding cycle based upon a predetermined target pressure, 2) being preprogrammed to alter the pressure exerted on the polymer a number of times over the course of a single injection molding cycle, or 3) a combination thereof. Useful pressure controls can alter the pressure of the hydraulic oil at the ram of the injection unit according to a predetermined protocol where the protocol includes a number of changes (e.g., from 1 to 20 changes) in pressure over the course of the injection molding cycle, e.g., the cavity filling portion of the injection molding cycle.

The injection molding apparatus 10 is capable of injecting a sufficient amount of molten polymer to fill the mold cavities under a hydraulic oil system pressure of no greater than 250 psi, preferably no greater than 200 psi.

Pressure control 26 is also capable of altering the velocity of the screw of the injection unit, which alters the velocity of the polymer as it enters the mold cavity. Preferably, the pressure control can be programmed to alter the velocity of the polymer a number of times (e.g., from 1 to 20 times) during the course of an injection molding cycle.

Examples of useful commercially available pressure controls included Moog servovalves (available from Moog, New York), Bosch servovalves (available from Bosch Automation Technology, Racine, Wis.) and SmartPump pressure controls (available from Engel, Ontario, Canada).

Clamping unit 18 houses the system that maintains the mold in a closed position during the injection molding process. When the molten polymer is injected into the mold cavity, the clamping unit exerts a force referred to as "clamp tonnage" (i.e., the force exerted on the mold by the clamping unit) on the mold to counter the force being exerted by the polymer as it enters the cavity. The clamp tonnage exerted during the injection molding cycle is sufficient to maintain the mold in a closed position during the injection molding cycle. Preferably the clamp tonnage is no greater than about 300 U.S. tons, more preferably no greater than about 150 U.S. tons, when simultaneously injecting polymer into from 8 to 16 cavities, each of which defines at least a portion of an oral brush body.

The apparatus can include a number of individual tufts of bristles extending into the mold cavities. The apparatus is capable of injecting polymer into the cavities at a velocity and pressure such that the predetermined position of the bristles is maintained during the injection molding process. Preferably the apparatus is capable of injecting polymer into the mold cavity at a velocity and pressure such that the polymer surrounds the exposed portion of the tufts of bristles without significantly altering the position of the bristles extending into the cavity and without creating flash (i.e., the presence of polymer in areas designed to be free of polymer).

Injection molding apparatus 10 is useful in a variety of injection molding processes. For injection molding processes that form oral brush bodies, the apparatus is preferably constructed such that the system pressure of the hydraulic oil at the ram 30 of the injection unit 20 is from about 100 psi to about 250 psi, more preferably from about 130 psi to about 200 psi. For injection molding processes that form oral brush bodies having smaller segments (e.g., a logo) and larger segments (e.g., the handle), the process preferably includes initially applying a relatively high pressure, preferably no greater than about 850 psi, which can be used to fill the smaller segment(s) of the oral brush bodies, and then decreasing the pressure to no greater than about 250 psi, preferably no greater than 200 psi. The apparatus then maintains the pressure at this decreased level until a sufficient amount of polymer has been injected into the mold cavity to fill the cavity, e.g., the portion of the cavity defining the handle and the head, and form the brush body. The pressure is then removed, the piston and ram retract, the mold opens, and the formed brush bodies are removed.

The injection molding processes for oral brush bodies can include a number of stages during which changes in the velocity of the screw or piston of the injection unit and changes in the system pressure of the hydraulic oil at the ram of the injection unit occur. The velocity and pressure can be altered a number of times throughout the stages of the injection molding cycle as necessary to accommodate the particular characteristics of the process. The cavities of the mold, e.g., dimension, detail of the cavities that define oral brush bodies, the number of cavities in the mold, and the presence of individual tufts of bristles extending into the mold cavity, affect the amount of pressure and velocity required to fill the mold cavities with polymer and to provide a brush body having predetermined characteristics.

One useful oral brush body injection molding process includes three stages. During the first stage a major portion of the mold cavity is filled (e.g., portions of the body such as the handle and the logo). During the second stage the handle of the brush body is filled out and packed with polymer. During this stage, the exterior of the oral brush body freezes, and the polymer shrinks as it cools. Additional polymer is forced into the mold cavity to fill the volume of the mold cavity, and additional pressure is applied to the polymer composition. During the third stage the screw of the injection mold unit recovers to the initial position and the injection unit reservoir receives additional polymer in preparation for the next injection of polymer into the mold cavity.

The polymer injected into the mold cavity is preferably polypropylene or a polymer composition that includes polypropylene. Examples of particularly useful polypropylene compositions are disclosed in copending U.S. application Ser. No. 09/385,578, filed Aug. 31, 1999, entitled, "Polypropylene Brush Bodies," attorney docket number 00216/453001, which is incorporated herein.

Preferably the polymer composition exhibits a melt flow rate of at least about 10 g/10 min, preferably from about 10 g/10 min to about 40 g/10 min, more preferably from about 12 g/10 min to about 35 g/10 min, most preferably from about 15 g/10 min to about 30 g/10 min as measured according to ASTM D1238-95. Other useful polymer compositions exhibit a melt flow rate of from about 30 g/10 min to about 40 g/10 min.

Useful polymer compositions include polypropylene. Polypropylene exists in a variety of forms, each of which exhibits a variety of properties. Preferably the polypropylene is a controlled rheology polypropylene, has a melt flow rate of no greater than 40 g/10 min, more preferably no greater than 30 g/10 min, and a tensile strength of at least about 3100 psi, more preferably from about 4,000 psi and 6,000 psi, most preferably at least about 4,700 psi.

Preferably the polypropylene is formulated to harden rapidly after being injected into a mold cavity. The ability to harden is referred to as "set time." Preferably the set time is sufficiently short so as to permit maximum utilization of the injection molding equipment.

Preferred polypropylene is at least about 97% isotactic polypropylene. Suitable polypropylene is available under the trade designations FINA 3824 and FINA 3825 from Fina Oil and Chemical Company (Dallas, Tex.), and PP1105 from Exxon Chemical (Houston, Tex.).

The polymer composition can include up to 100% by weight polypropylene. Preferably the polypropylene is present in the polymer composition in an amount of from about 75% by weight to about 90% by weight, most preferably about 85% by weight. The polypropylene preferably has a narrow molecular weight range.

The polypropylene also includes a catalyst that controls the length of the polymer chain so as to produce a narrow molecular weight range of polymer. This is referred to as a controlled rheology polypropylene. Preferred catalysts also promote rapid hardening of the polypropylene after it has been injected into a mold cavity. Examples of useful catalysts include Ziegler-Natta catalysts, and Ziegler-Natta-type catalysts.

The polymer composition can also include a plastomer. Plastomers have properties that are generally intermediate to those of thermoplastic materials and elastomeric materials. Preferably the plastomer modifies the impact properties (i.e., the reaction to a force) of the polypropylene and toothbrush bodies made therefrom. Preferred plastomers exhibit a melt flow rate of from about 1 g/10 min to about 5 g/10 min, more preferably from about 1.3 g/10 min to about 5.2 g/10 min, and a tensile strength of from about 1500 psi to about 3000 psi, more preferably about 2500 psi.

Examples of useful plastomers include copolymers of ethylene and alpha-olefins, e.g., $C_3$ to $C_{20}$ alpha-olefin. Suitable commercial plastomers are available under the trade designations Exact 4033 from Exxon Chemical.

When plastomer is present in the polymer composition, it is present in an amount of at least about 2% by weight, preferably from about 2% by weight to about 30% by weight, more preferably from about 10% by weight to about 25% by weight, most preferably about 15% by weight based on the weight of the polymer composition.

The polymer composition may also include an ethylene-alpha olefin interpolymer. Preferred ethylene-alpha olefin interpolymers exhibit a melt flow rate of from about 1 g/10 min to about 5 g/10 min, more preferably about 5 g/10 min, and a tensile strength of from about 1500 psi to about 3000 psi, more preferably about 1700 psi. Examples of commercially available ethylene-alpha olefin interpolymers are available under the FLEXOMER trade designation from Union Carbide (Danbury, Conn.), e.g., FLEXOMER POLYOLEFIN DFDB-1085 Natural.

When an ethylene-alpha olefin interpolymer is present in the polymer composition, it is present in an amount of at least about 2% by weight, preferably from about 2% by weight to about 30% by weight, more preferably from about 10% by weight to about 25% by weight, most preferably about 15% by weight based on the weight of the polymer composition.

Preferably portions of oral brush bodies that include the polymer composition are stable to ultraviolet (UV) light such that the body is free from discoloration due to exposure to UV light over time.

The polymer composition can also include a variety of other components including calcium carbonate, antioxidant, pigment (e.g., titanium dioxide), dye, UV brighteners, and combinations thereof.

Other embodiments are within the claims.

What is claimed is:

1. A method of making an oral brush body using an injection molding apparatus comprising a mold cavity defining at least a portion of the oral brush body, said method comprising:

injecting polymer into the mold cavity at a pressure no greater than about 250 psi throughout the entire filling process and in an amount sufficient to fill said cavity during a first injection mold cycle;

comparing the amount of pressure exerted during the first injection mold cycle with a predetermined pressure; and making an automatic adjustment such that the pressure exerted during a subsequent molding cycle achieves the predetermined pressure.

2. The method of claim 1, wherein said pressure is from about 100 psi to about 250 psi.

3. The method of claim 1, wherein said pressure is from about 130 to about 200 psi.

4. The method of claim 1, wherein said pressure is no greater than about 200 psi.

5. The method of claim 1, further comprising altering said pressure during an injection molding cycle from a first pressure to a second pressure, said second pressure a being no greater than about 220 psi.

6. The method of claim 1, further comprising removing said oral brush body from said mold cavity.

7. The method of claim 1, wherein said mold comprises a plurality of mold cavities each defining an oral brush body, and said injecting further comprises injecting polymer into said plurality of mold cavities at a pressure no greater than about 250 psi throughout the entire filling process and in an amount sufficient to fill said cavities.

8. The method of claim 7, wherein said mold comprises $2^{2+n}$ cavities each defining an oral brush body where n=0–3.

9. The method of claim 1, wherein said polymer comprises polypropylene.

10. The method of claim 1, wherein said polymer has a melt flow rate of from about 10 g/10 min to about 40 g/10 min.

11. The method of claim 1, wherein said polymer has a melt flow rate of from about 12 g/10 min to about 35 g/10 min.

12. The method of claim 1, wherein said polymer has a melt flow rate of from about 15 g/10 min to about 30 g/10 min.

13. The method of claim 1, wherein said polymer comprises polypropylene having a melt flow rate of in the range of from about 30 g/10 min to about 40 g/10 min.

14. The method of claim 1, wherein said polymer further comprises a plastomer.

15. The method of claim 14, wherein said plastomer has a melt flow rate of from about 1.3 g/10 min to about 5.2 g/10 min.

16. The method of claim 14, wherein said plastomer has a tensile strength of from about 1500 to about 3000 psi.

17. The method of claim 14, wherein said plastomer comprises a copolymer comprising ethylene and a polyalpha-olefin.

18. The method of claim 14, wherein said polymer comprises from about 2% by weight to about 30% by weight plastomer.

19. The method of claim 14, wherein said polymer comprises from about 10% by weight to about 20% by weight plastomer.

20. The method of claim 14, wherein said polymer comprises from about 75% by weight to about 90% by weight of said polypropylene; and from about 10% by weight to about 25% by weight of said plastomer.

21. An injection molding apparatus comprising:
    a mold comprising a cavity defining at least a portion of the oral brush body;
    an injection unit in communication with said cavity; and
    a control in communication with said injection unit, said control being capable of comparing the amount of pressure exerted by the injection unit during a first injection mold cycle with a predetermined pressure and making an automatic adjustment such that the pressure exerted during a subsequent molding cycle achieves the predetermined pressure,
    said injection unit being capable of injecting a polymer into said mold cavity at a pressure no greater than about 250 psi throughout the entire filling process and in an amount sufficient to fill said cavity.

22. The apparatus of claim 21, wherein said mold comprises a plurality of cavities, each cavity defining at least a portion of an oral brush body, said injection unit being capable of injecting polymer into said cavities at a pressure no greater than about 250 psi throughout the entire filling process and in an amount sufficient to fill said cavities.

23. The apparatus of claim 21, wherein said polymer comprises polypropylene.

24. The apparatus of claim 21, wherein said polymer has a melt flow rate of from about 12 g/10 min to about 35 g/10 min.

* * * * *